US012693991B2

(12) United States Patent (10) Patent No.: US 12,693,991 B2
Beeler et al. (45) Date of Patent: Jul. 28, 2026

(54) SYSTEM AND METHOD FOR SYSTEM REPLICATION AND MIGRATION FOR IN-MEMORY DATABASE SYSTEMS

(71) Applicant: OPEN TEXT CORPORATION, Waterlo (CA)

(72) Inventors: David Edward Beeler, Noblesville, IN (US); Jon G. Bryan, Jr., Indianapolis, IN (US); Fuxing Luo, Scarborough (CA)

(73) Assignee: OPEN TEXT CORPORATION, Waterloo (CA)

( * ) Notice: Subject to any disclaimer, the term of this patent is extended or adjusted under 35 U.S.C. 154(b) by 7 days.

(21) Appl. No.: 18/317,678

(22) Filed: May 15, 2023

(65) Prior Publication Data

US 2023/0367742 A1 Nov. 16, 2023

Related U.S. Application Data

(60) Provisional application No. 63/341,925, filed on May 13, 2022.

(51) Int. Cl.
*G06F 16/11* (2019.01)
*G06F 16/178* (2019.01)

(52) U.S. Cl.
CPC .......... *G06F 16/119* (2019.01); *G06F 16/122* (2019.01); *G06F 16/178* (2019.01)

(58) Field of Classification Search
CPC .... G06F 16/119; G06F 16/122; G06F 16/178; G06F 16/214
See application file for complete search history.

(56) References Cited

U.S. PATENT DOCUMENTS

| | | | |
|---|---|---|---|
| 8,001,079 B2 | 8/2011 | Lu et al. | |
| 2010/0191884 A1* | 7/2010 | Holenstein | .......... G06F 16/2343 |
| | | | 707/613 |
| 2017/0147227 A1* | 5/2017 | Stabrawa | ................ G06F 3/065 |
| 2018/0165339 A1* | 6/2018 | Goldmann | .............. G06F 16/27 |
| 2022/0147490 A1* | 5/2022 | Shivani | ................. G06F 16/178 |

* cited by examiner

*Primary Examiner* — Aleksandr Kerzhner
*Assistant Examiner* — Aryan D Toughiry
(74) *Attorney, Agent, or Firm* — Sprinkle IP Law Group

(57) ABSTRACT

Systems and methods for performing server migrations in an in-memory database system environment are provided. Various embodiments of the present technology provide systems and methods for actively monitoring a queue of the in-memory database system at the target file system to determined when all of the contents of the queue have been flushed to disk. Responsive to the determination, the source file system can be shut down, and replicated to the target file system.

9 Claims, 3 Drawing Sheets

SYSTEM AND METHOD FOR SYSTEM REPLICATION AND MIGRATION FOR IN-MEMORY DATABASE SYSTEMS

CROSS-REFERENCE TO RELATED APPLICATION(S)

This application claims a benefit of priority under 35 U.S.C. § 119(e) from U.S. Provisional Application No. 63/341,925, filed May 13, 2022, entitled "SYSTEM AND METHOD FOR SYSTEM REPLICATION AND MIGRATION FOR IN-MEMORY DATABASE SYSTEMS," which is fully incorporated by reference herein for all purposes.

TECHNICAL FIELD

This disclosure relates generally to the field of cloud migration and system replication for computer operating systems, and in particular, to an apparatus and method providing cloud migration and system replication for in-memory database systems.

BACKGROUND

An in-memory database system (or memory resident database) is a database management system that primarily relies on main memory for computer data storage. An in-memory database system, compared to database management systems that employ a disk storage mechanism, are typically faster than disk-optimized databases because disk access is slower than memory access and the internal optimization algorithms are typically simpler and execute fewer CPU instructions. Accessing data in memory eliminates seek time when querying the data, which provides faster and more predictable performance than disk-based systems. One example of an in-memory database system is SAP HANA® developed by SAP SE®.

In database system environments, for a variety of reasons, it is sometimes desired to perform a server migration—the process of moving data from one server (a source) to another server (a target). During a migration process, it is desirable to minimize downtime while moving the data and functionality of a source server to a target server. In the context of migrations of servers using an in-memory database system, it can be challenging to accurately replicate the source server without significant server downtime.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Generally, the present disclosure describes a system and method for performing server migrations in an in-memory database system environment. As discussed above, during a migration process, the data and functionality of a source server is replicated on a target server. Commonly owned U.S. Pat. No. 8,001,079, entitled "System and method for system state replication" by Lu et al. (issued on Aug. 16, 2011), describes a system and method for data backup and recovery, in particular for backing up an entire server (i.e., system state and data) in substantially real-time, and is incorporated herein by reference in its entirety for all purposes. The disclosed systems, methods, and computer products describe techniques for replicating and migrating the data and functionality from a source file system of an in-memory database system to a target system. For the purposes of this description, the systems, methods, and computer products are described in the context of SAP HANA® database systems, although the techniques can be used in other database systems, as one skilled in the art would understand.

Figure 1:
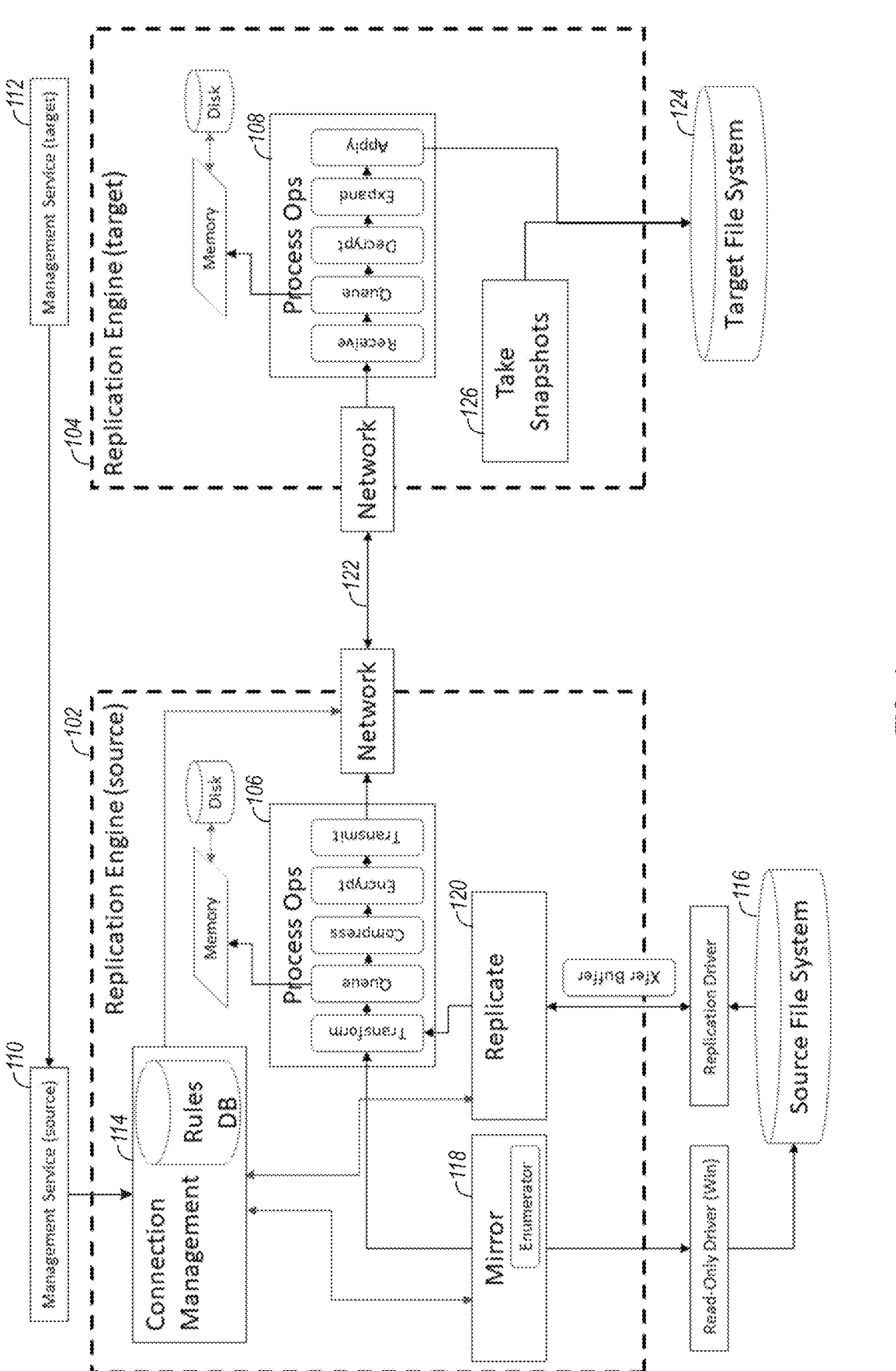
FIG. 1 is a block diagram of source and target file systems, and source and target replication engines.

FIG. 1 is a block diagram showing an architectural diagram of source and target file systems for a SAP HANA® in-memory database system. As discussed above, organizations sometimes need to migrate database systems from an existing server (a source) to a new server (a target). For example, a migration process may be used to migrate to an upgraded server, a server in a new location, etc., as one skilled in the art would understand. FIG. 1 shows a source replication engine 102, a target replication engine 104 (both shown by dashed lines), and various components of each replication engine. For example, both the source and target replication engines 102 and 104 show process operations (Process Ops 106, 108). In the source, the process ops 106 includes operations "transform," "queue," "compress," "encrypt," and "transmit." Similarly, in the target, the process ops 108 includes operations "receive," "queue," "decrypt," "expand," and "apply." A management service 110 at the source and management service 112 at the target interfaces with one another and to connection management block 114 (and an associated rules database) of the source replication engine102. The source replication engine 102 interfaces with a source file system 116 via the mirror and replicates blocks 118 and 120.

As shown, the replication engine 102 and target replication engine 104 can communication with each other over network 122. The process ops 108 of the target receives data from the source replication engine over the network 122. After the various processes are completed, the received data is applied to the target file system 124. If desired, snapshots 126 can be taken, as desired.

Figure 2:
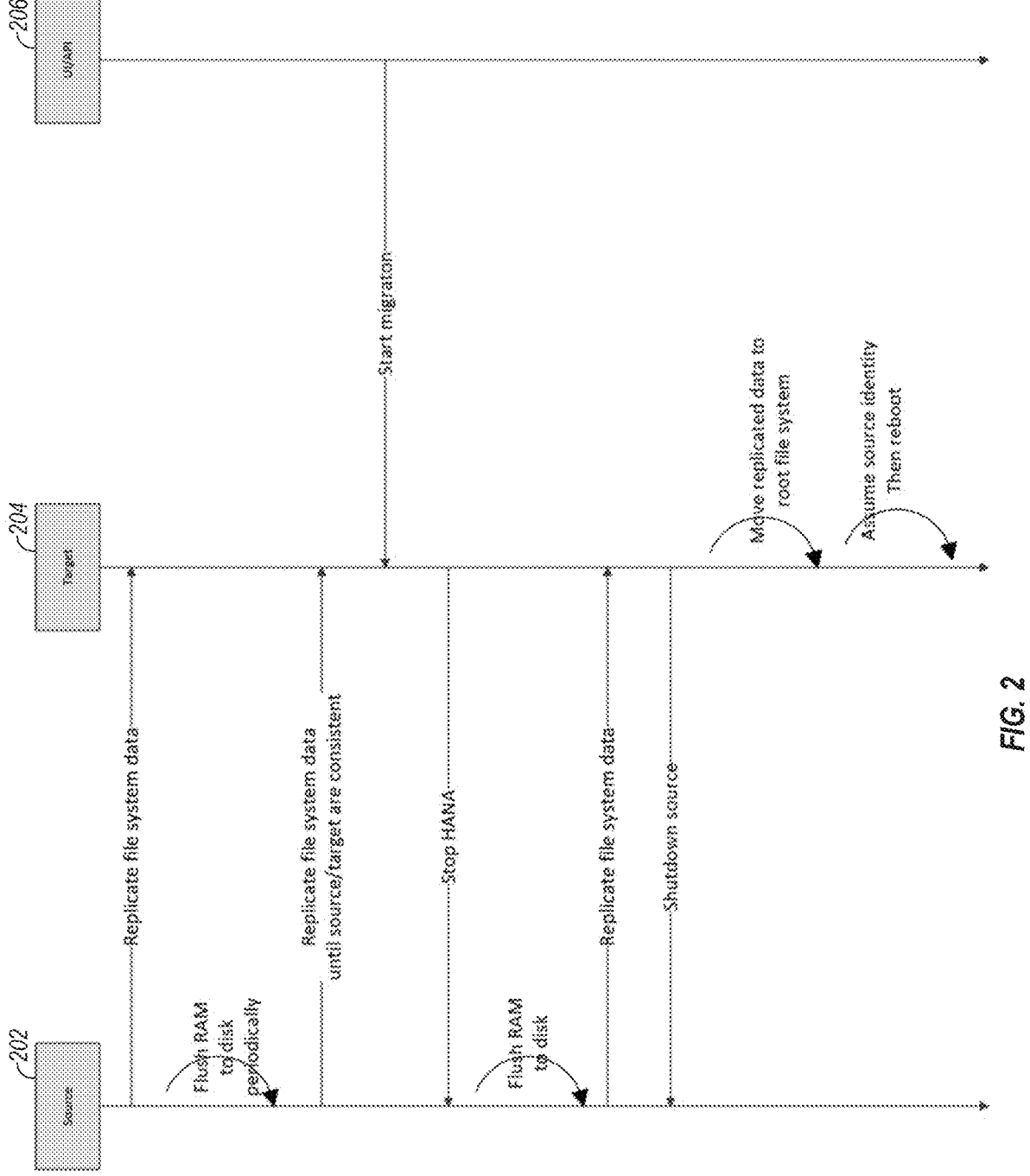
FIG. 2 is a process flow diagram depicting an exemplary migration process.

FIG. 2 is a process flow diagram depicting exemplary application of replication technology for migrating servers in an in-memory database system, such as SAP HANA. FIG. 2 shows blocks representing a source server 202, a target server 204, and a user interface (UI)/API 206. In some embodiments, an agent application is installed on both the source and target servers. In some examples such an agent can comprise functionalities provided by the management services and replication engines shown in FIG. 1. The agent applications are responsible for overseeing the replication processes described below. This example is described in the context of file system replication, although other systems can also be used, as one skilled in the art would understand.

Generally, any changes made to the file system of the source 202 pass through the agent, are captured, and transmitted to the target 204, and are applied to the target replica (the copy of the source data) to maintain a real-time synchronization. In conventional systems, at cutover, a cutover process begins and may wait for a user to intervene to oversee the process. In the example shown in FIG. 2, the process is more automated, and performs functions that a user could not do manually, such as the active monitoring of the queues (e.g., the processes ops queues, etc.).

As shown in FIG. 2, a first step of the process is to replicate file system data. Note that during the normal operation of SAP HANA, the random access memory (RAM) (or other volatile memory) is flushed to disk periodically, as sown by the arrow in FIG. 2. For example, at a regular interval (e.g., every 5 minutes), data is written to disk. When data is written to disk, these changes (that are committed to disk) are captured and sent to the target ("Replicate file system data until source/target are consistent"). Responsive to a command to start a migration (e.g., received from the UI 206), the SAP HANA databases (source databases) are taken offline ("Stop HANA). When SAP HANA is taken offline, any changes in memory are committed to disk at the final "Flush RAM to disk" step.

As mentioned above, the system (e.g., via the management service) actively monitors the queue of the source system and determines when the final flush is complete. This active monitoring reduces migration time, as the system will immediately know when the final flush is complete. The system monitors the SAP HANA application/database status and any changes are also replicated ("Replicate file system data") at the target 204. In some embodiments, the agent monitors the replication queues to determine when there are changes that need to be replicated. Monitoring the queues ensures that no data is lost and also provides more precise control of timing of the process. For example, because the queues are being monitored, the system will know exactly when the flush RAM to disk process is complete. When the system determines that this process is complete, the source server is shut down ("Shutdown source"). The source server is shut down for a few reasons. For example, shutting down the source prevents the source and target servers being online simultaneously. Another reason to shut down the source is to maintain the source server's pristine state or pre-cutover state, so if something goes wrong with the cutover, the source server can be brought back online and be at the same point in the process.

At the target server, a transformational process is performed, in which the target is turned into an exact copy of the source. Note that some of the target server's configuration information (e.g., configuration information that tells the target server how to communicate with its hardware, interface cards, storage, etc.) is kept, but the source server's information is brought over such that the target server can assume the source server's identity ("Move replicated data to root file system"). Next the target server reboots to assume the source server's identity ("Assume source identity Then reboot"). When the target server reboots, the target server has an exact copy of the source server's data, and the workload that existed in production now exists in the target server and production related activity can resume immediately.

During the migration process illustrated in FIG. 2, the total server downtime is the time between when the source goes offline ("Stop HANA") and when the target server goes online (after the target server reboot). While the total downtime can depend on a lot of factors, generally, the downtime of the automated migration process shown in FIG. 2 (e.g., 5 minutes) is significantly shorter than the downtime from a manual migration process (e.g., 30 minutes).

Figure 3:
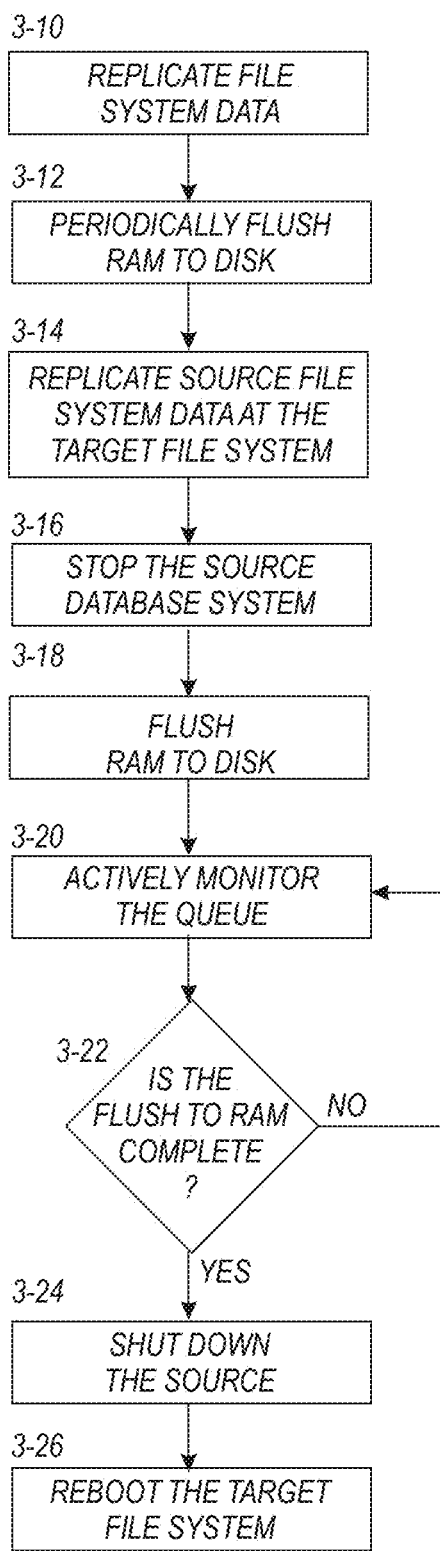
FIG. 3 is a flowchart depicting a process for migrating an in-memory database system from a source file system to a target file system.

FIG. 3 is a flow chart illustrating one example of a process for migrating an in-memory database system from a source file system to a target file system. The process begins at step 3-10, where the file system data of the source is replicated. At step 3-12, the database contents (e.g., in RAM) are flushed to disk periodically. When data is written to disk, these changes (that are committed to disk) are captured and replicated at the target file system (step 3-14). Responsive to a command to start a migration, the SAP HANA databases (source databases) are taken offline (step 3-16). When SAP HANA is taken offline, any changes in memory are committed to disk at the final flush to disk (step 3 18).

As discussed above, the system (e.g., via the management service) actively monitors the queue of the source system (step 3-20) and determines when the final flush is complete (step 3-22). This active monitoring reduces migration time, as the system will immediately know when the final flush is complete. If the flush is not complete, the system continues to actively monitor the queue. When the system determines that the flush is complete, the source server is shut down (step 3-24). At the target server, a transformational process is performed, in which the target is turned into an exact copy of the source. At step 3-26, the target server reboots to assume the source server's identity. When the target server reboots, the target server has an exact copy of the source server's data, and the workload that existed in production now exists in the target server and production related activity can resume immediately.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method for migrating an in-memory database system from a source file system to a target file system, the method comprising:

replicating file system data from the source file system to the target file system;

in the source file system, periodically flushing contents in volatile memory to non-volatile memory;

replicating source file system data at the target file system until the target file system is consistent with the source file system;

stopping the in-memory database system at the source file system responsive to receiving an indication via a user interface to start a migration process;

capturing changes made by the source file system prior to stopping the in-memory database system by flushing contents in volatile memory to non-volatile memory to commit any changes in volatile memory to non-volatile memory;

actively monitoring, by a management service, a queue of the in-memory database system at the source file system, the actively monitoring the queue including:

determining if all changes to the source file system have been captured; and determining if the volatile memory to non-volatile memory flush has been completed in the source file system by:

polling, by a management service at the source file system, a replication engine at the source file system; and receiving, by a management service, a response from the replication engine indicating that the volatile memory to non-volatile memory flush has been completed;

responsive to determining that the volatile memory to non-volatile memory flush has been completed in the source file system:

replicating the source file system data at the target file system;

causing a target server of the target file system to assume an identity of a source server of the source file system; and rebooting the target file system.

2. The method of claim 1, wherein the volatile memory is random access memory (RAM).

3. The method of claim 1, wherein the non-volatile memory is a disk storage system.

4. A system for migrating an in-memory database system from a source file system to a target file system, the system comprising:

a processor; and a non-transitory computer readable medium storing instructions translatable by the processor, the instructions when translated by the processor perform:

replicating file system data from the source file system to the target file system;

in the source file system, periodically flushing contents in volatile memory to non-volatile memory;

replicating source file system data at the target file system until the target file system is consistent with the source file system;

stopping the in-memory database system at the source file system responsive to receiving an indication via a user interface to start a migration process;

capturing changes made by the source file system prior to stopping the in-memory database system by flushing contents in volatile memory to non-volatile memory to commit any changes in volatile memory to non-volatile memory;

actively monitoring, by a management service, a queue of the in-memory database system at the source file system, the actively monitoring the queue including:

determining if all changes to the source file system have been captured; and determining if the volatile memory to non-volatile memory flush has been completed in the source file system by:

polling, by a management service at the source file system, a replication engine at the source file system; and receiving, by a management service, a response from the replication engine indicating that the volatile memory to non-volatile memory flush has been completed;

responsive to determining that the volatile memory to non-volatile memory flush has been completed in the source file system:

replicating the source file system data at the target file system;

causing a target server of the target file system to assume an identity of a source server of the source file system; and rebooting the target file system.

5. The system of claim 4, wherein the volatile memory is random access memory (RAM).

6. The system of claim 4, wherein the non-volatile memory is a disk storage system.

7. A computer program product comprising a non-transitory computer readable medium storing instructions translatable by a processor, the instructions when translated by the processor perform, in an enterprise computing network environment:

replicating file system data from a source file system to a target file system;

in the source file system, periodically flushing contents in volatile memory to non-volatile memory;

replicating source file system data at the target file system until the target file system is consistent with the source file system;

stopping an in-memory database system at the source file system responsive to receiving an indication via a user interface to start a migration process;

capturing changes made by the source file system prior to stopping the in-memory database system by flushing contents in volatile memory to non-volatile memory to commit any changes in volatile memory to non-volatile memory;

actively monitoring, by a management service, a queue of the in-memory database system at the source file system, the actively monitoring the queue including:

determining if all changes to the source file system have been captured; and determining if the volatile memory to non-volatile memory flush has been completed in the source file system by:

polling, by a management service at the source file system, a replication engine at the source file system; and receiving, by a management service, a response from the replication engine indicating that the volatile memory to non-volatile memory flush has been completed;

responsive to determining that the volatile memory to non-volatile memory flush has been completed in the source file system:

replicating the source file system data at the target file system;

causing a target server of the target file system to assume an identity of a source server of the source file system; and rebooting the target file system.

8. The computer program product of claim 7, wherein the volatile memory is random access memory (RAM).

9. The computer program product of claim 7, wherein the non-volatile memory is a disk storage system.

* * * * *